March 4, 1930.                      A. COOK                    1,749,527
                         COMBINATION COOKER AND ROASTER
                              Filed June 2, 1928      2 Sheets-Sheet 1
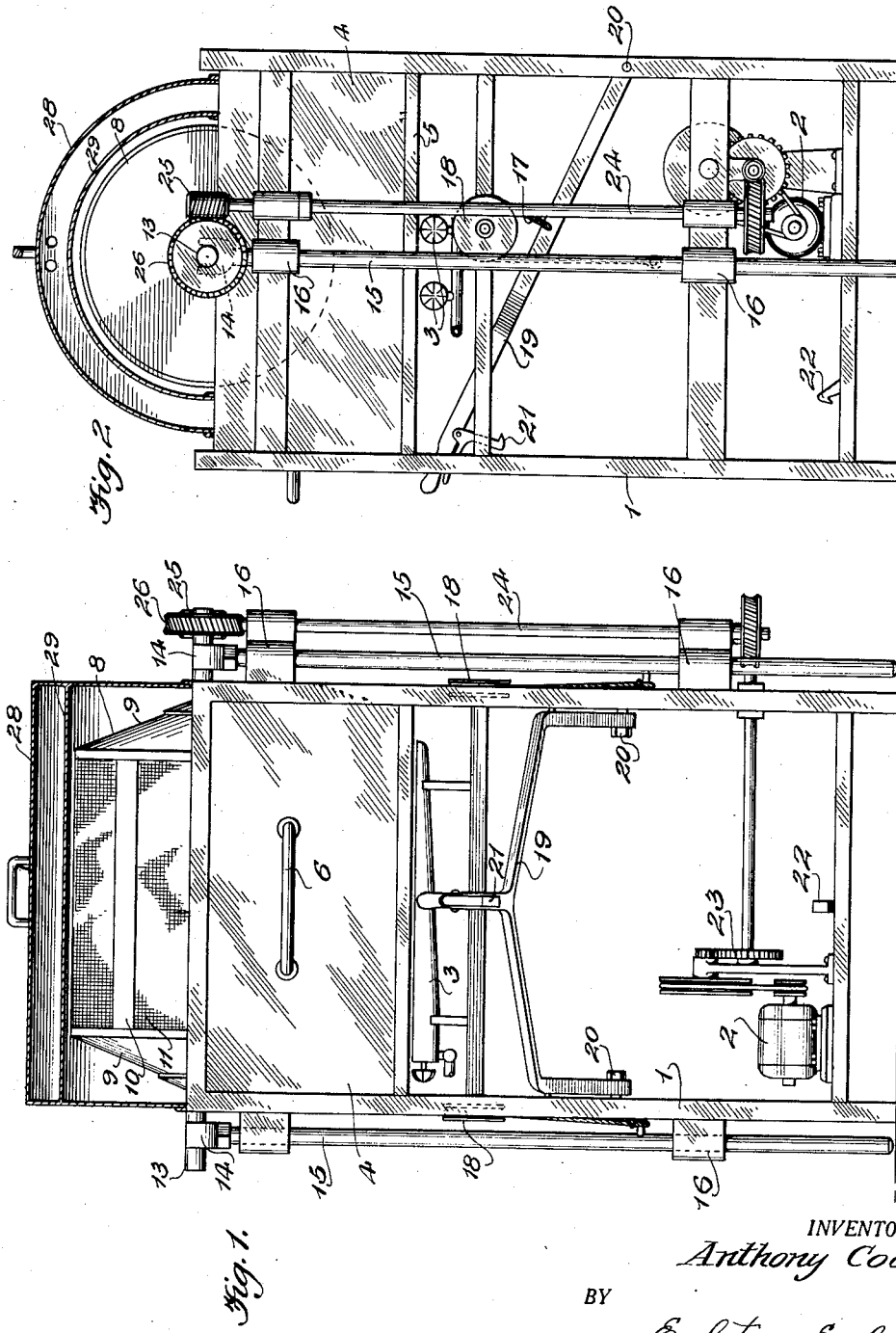
INVENTOR.
Anthony Cook.
BY
Eccleston & Eccleston,
ATTORNEYS.

March 4, 1930.   A. COOK   1,749,527
COMBINATION COOKER AND ROASTER
Filed June 2, 1928    2 Sheets-Sheet 2

INVENTOR.
Anthony Cook.
BY
Eccleston & Eccleston
ATTORNEYS.

Patented Mar. 4, 1930

1,749,527

UNITED STATES PATENT OFFICE

ANTHONY COOK, OF LOGAN, OHIO

COMBINATION COOKER AND ROASTER

Application filed June 2, 1928. Serial No. 282,466.

This invention relates to the art of cooking and roasting shelled nuts such as Spanish and jumbo peanuts, almonds, etc., and has for its primary object to provide a device which will in a single operation both cook and roast the nuts.

A further object of the invention resides in the construction of such a device which is extremely economical in the use of oil and heat and requires little or no attention in operation.

Another object of the invention consists in the provision of a mechanism for raising and supporting in raised position the container in which the nuts are cooked so as to permit the draining off of the oil without the use of extra pans, etc.

Other objects and advantages of the invention will be apparent from the following description when taken in connection with the accompanying drawings; in which Figure 1 is a front elevation of the apparatus, parts being shown in section.

Figure 2 is a side elevational view of the apparatus, parts also being shown in section.

Figure 3:
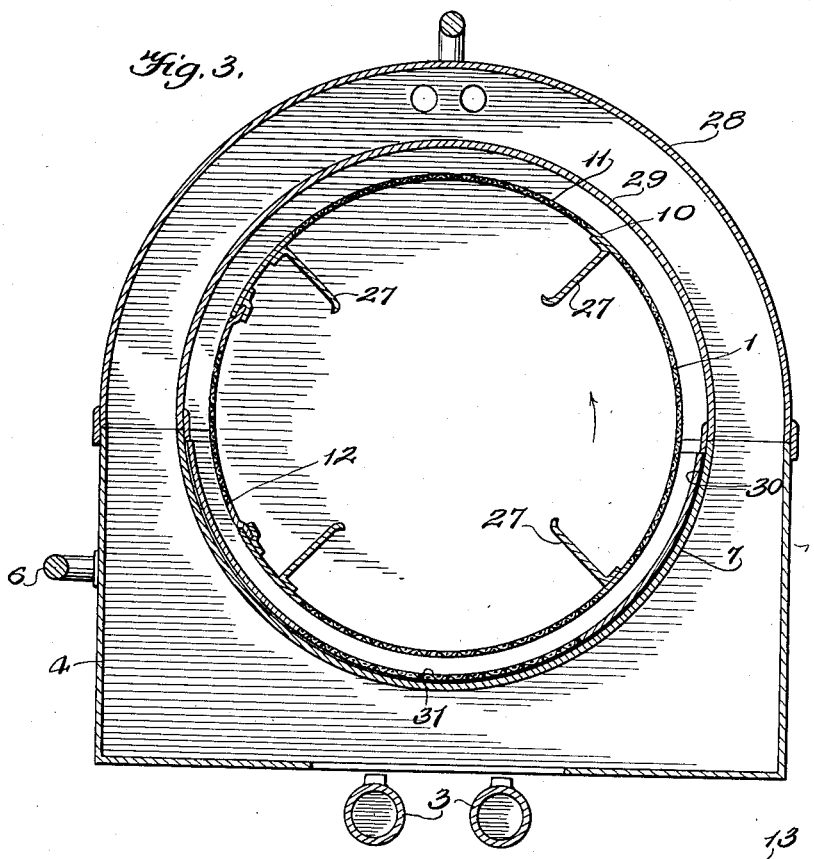
Figure 3 is a transverse sectional view through the cooking and roasting container and associated parts.
Figure 4:
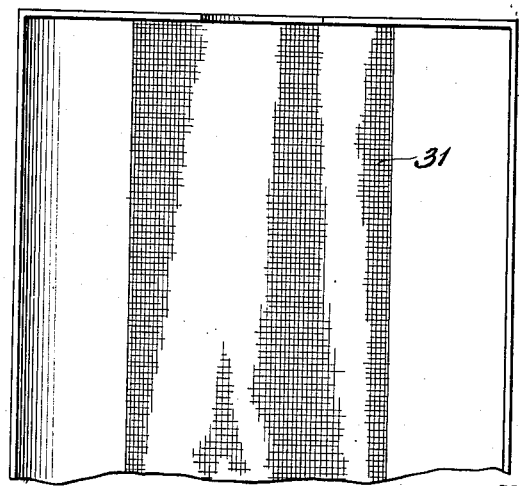
Figure 4 is a fragmentary plan view of a strainer for use with the apparatus.
Figure 5:
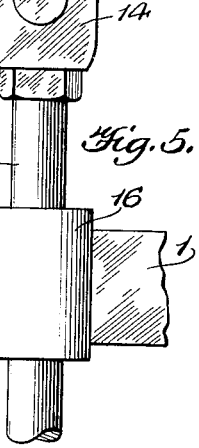
Figure 5 is a detail view of one of the vertically movable bearings for the rotating drum.

In the art of preparing nuts as heretofore practiced it has been the usual custom to roast them or to cook them in oil as desired. By the apparatus about to be described herein, however, means are provided for both cooking the nuts in oil and for roasting them in a single apparatus as successive steps in the operation of the device. Furthermore, the heat is confined about the rotating drum so that the nuts are brought into direct contact therewith from time to time during the rotation of the drum thereby conserving the use of fuel and expediting the cooking operation. And again, by both cooking in oil as well as roasting the nuts an improved product is provided in that the nuts are more resistant to moisture and consequently are retained in a fresh and brittle condition for a longer period of time.

In the apparatus as disclosed in the accompanying drawings and heretofore briefly referred to, the numeral 1 designates the framework on which is mounted the motor 2 for driving the drum, the burners 3 for heating the oil in the drum and pan and for carrying out the roasting process.

Mounted in the upper portion of the framework 1 is a tank 4. This tank is slidably mounted on guideways 5 and is provided with a handle 6 by means of which the tank may be removed for cleaning, changing oil compound and for other purposes. The tank 4 is of rectangular outline but the interior thereof is rounded as indicated by numeral 7 to provide a receptacle or inner tank for the oil compound. By this construction a smaller quantity of oil is necessary inasmuch as it is retained in close proximity to the rotating drum in which the nuts are cooked and roasted.

The drum which is designated by the numeral 8 is provided with imperforate metal ends 9 on which are supported the longitudinally extending bars 10. The intervening spaces between bars 10 is covered by metal screening or the like 11, one of these screens taking the form of a sliding door 12 to permit access to the interior of the drum. The ends 9 of the drum are preferably tapered or cone shaped, so as to drain the oil from the outside edges of the drum when the latter is raised from the tank at the end of the cooking operation.

Shafts 13 are disposed longitudinally of the drum and are mounted in bearings 14 on the vertically slidable rods 15. One of the shafts 13 is of hollow construction and serves to permit access to the interior of the drum so that the nuts may be tested without interrupting the cooking operation. The rods 15 are confined within slide bearings 16 and may be raised by means of flexible ropes or the like 17. Two of these flexible elements 17 are preferably employed and have their ends connected to rods 15 and are then passed over pulleys 18 which are rotatably mounted on the frame 1. The opposite ends of members 17 are fixed to a lever 19 pivoted to frame 1 as indicated by numeral 20. Obviously by drawing the lever 19 downwardly the rods 15, bearings 14 and the rotatable drum may be raised out of the tank 4, and in order to lock the drum in raised position the lever and frame are provided with complementary locking members 21 and 22 respectively.

While the drum may be manually rotated if desired, it is preferable that the same be power driven, and to this end a train of gearing 23 transmits power from the motor 2 to the vertically disposed shaft 24. This shaft is provided with a worm 25 on its upper end which meshes with a worm wheel 26 fixed on one of the shafts 13 of the drum 8 and serves to impart a continuous rotary movement to the latter.

As already mentioned the present apparatus is designed to both cook and roast the nuts and to this end the interior of the drum is provided with a plurality of inwardly directed plates 27 which are fixed to bars 10. These plates serve to not only agitate the material within the drum but also to raise a portion of the material from the oil and sustain it in direct contact with the heat until the plate reaches such a position that the material will fall therefrom by gravity. Furthermore, in order that the heat may be concentrated about the drum a semi-cylindrical cover 28 is provided. This cover rests upon the upper edge of the tank 4 and is provided with an inner semi-cylindrical cover 29 which engages the upper edge of the inner tank 7.

In the operation of nut cookers it has been found that small pieces of nuts escape through the mesh of the rotating drum and are deposited in the bottom of the tank containing the cooking oil. To remove these particles from the oil would necessitate that the apparatus be completely stopped and the tank removed and drained. To overcome this difficulty I provide a substantially semi-circular tray 30 having a bottom formed of wire mesh or the like 31. This tray is normally seated within the inner tank 7 as indicated in Figure 1, and should it be found desirable to remove particles of nuts from the oil it is only necessary that this tray be lifted from the tank and inverted. In lifting the element 30 from the tank the oil passes through screen 31 to the bottom of the tank, and is thus completely freed of the foreign matter such as particles of nuts, etc.

In operation, the tank 7 having been filled with oil, and the drum 8 charged with nuts to be cooked, the cover 28—29 is put in position and the cooking and roasting processes begun. As the drum rotates through the heated oil the nuts are partly cooked, and as each plate 27 passes across the bottom of the tank it picks up a portion of the nuts and holds them in direct contact with the heat until such time as the plate assumes an inwardly and downwardly inclined position, at which time the nuts will fall to the bottom of the drum to receive a further cooking operation in the oil. It will thus be seen that the nuts are alternately cooked in oil and roasted so long as the drum continues to rotate, it being understood that the speed of rotation of the drum may be varied as desired. By thus partly cooking in oil and partly roasting the material a more improved product is provided in that the nuts are less susceptible to moisture and will be maintained fresh and brittle over a longer period. Moreover, the combined process as carried out by the present apparatus greatly reduces the amount of cooking oil required with a given amount of material, and also reduces to a large extent the amount of heat necessary to complete the cooking operation. When the nuts have reached the proper stage in the process the burners may be turned off, the motor stopped, cover 28—29 removed, and the lever 19 lowered until the latches 21 and 22 are engaged. This movement of the lever raises the drum 8 out of the tank 7 and suspends it thereabove so that the oil may drain from the nuts back into the tank. It is thus apparent that the use of extra vessels in the draining process is dispensed with; also when in elevated position, the distance between the bottom of the drum 8 and the tank 7 is sufficient to permit the insertion of a container to receive the nuts when the cover 12 is removed.

From the foregoing description taken in connection with the accompanying drawings it will be apparent that I have devised an exceedingly simple and inexpensive construction of combined cooker and roaster, which provides means for intermittently cooking and roasting nuts and similar articles; that it is so designed as to allow for the draining of the material without need of extraneous apparatus, and that it is extremely economical in the use of cooking oil and fuel.

In accordance with the patent statutes I have described what I now believe to be the preferred embodiment of the invention, but it is to be understood that various changes in the details of construction may be made without departing from the spirit of the invention, and also such changes or modifications are intended to be included within the scope of the appended claims.

What I claim as new and desire to secure by Letters Patent is:

1. In a device of the class described, a tank for cooking oil, a drum for rotation within said tank, bearings on which said drum is rotated, and means for raising and lowering said bearings.

2. In a device of the class described, a tank for cooking oil, a drum of foraminous material rotatably mounted in said tank, and one or more radially extending plates within said drum.

3. In a device of the class described, a tank for cooking oil, a drum of foraminous material rotatably mounted in said tank, and a plurality of longitudinally-extending plates secured to the interior wall of said drum and extending radially toward its axis.

4. In a device of the class described, a frame, a tank slidably mounted in said frame and adapted to contain cooking oil, a pair of vertically reciprocable bearings disposed at the respective ends of said tank, and a drum rotatably mounted in said bearings.

5. In a device of the class described, a frame, a tank slidably mounted in said frame and adapted to contain cooking oil, a drum mounted for rotation within said tank, means for raising said drum out of the tank, and a strainer disposed within said tank below said drum.

6. In a device of the class described, a frame, a tank in said frame and comprising a rectangular outer member and a semi-cylindrical inner member, a semi-cylindrical strainer mounted within said inner member, and a drum rotatably mounted within said inner member.

ANTHONY COOK.